(12) United States Patent
Oh

(10) Patent No.: US 7,899,487 B2
(45) Date of Patent: Mar. 1, 2011

(54) MOBILE COMMUNICATION TERMINAL AND LINK MANAGEMENT METHOD OF THE SAME

(75) Inventor: Jung Kyun Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 434 days.

(21) Appl. No.: 11/543,873

(22) Filed: Oct. 6, 2006

(65) Prior Publication Data

US 2007/0099672 A1 May 3, 2007

(30) Foreign Application Priority Data

Oct. 28, 2005 (KR) .................... 10-2005-0102635

(51) Int. Cl.
  *H04M 1/00* (2006.01)
  *H04B 1/38* (2006.01)
  *G06F 17/00* (2006.01)
  *G06F 17/20* (2006.01)
  *G06F 3/00* (2006.01)

(52) U.S. Cl. .................. 455/550.1; 455/566; 715/200; 715/700

(58) Field of Classification Search .......... 370/310–350; 455/550.1, 566; 715/200, 700
See application file for complete search history.

(56) References Cited

U.S. PATENT DOCUMENTS

| | | | | |
|---|---|---|---|---|
| 5,815,142 A * | 9/1998 | Allard et al. | .................. | 345/173 |
| 6,094,529 A * | 7/2000 | Jeffries et al. | ................. | 717/110 |
| 6,804,207 B2 * | 10/2004 | Bolgiano et al. | .............. | 370/320 |
| 6,847,377 B2 * | 1/2005 | Kitahara et al. | ............... | 345/600 |
| 7,532,913 B2 * | 5/2009 | Doulton | ........................ | 455/566 |
| 2001/0006889 A1 * | 7/2001 | Kraft | ............................. | 455/412 |
| 2002/0128047 A1 * | 9/2002 | Gates | ............................. | 455/566 |
| 2002/0155826 A1 * | 10/2002 | Robinson et al. | .............. | 455/412 |
| 2002/0178007 A1 * | 11/2002 | Slotznick et al. | ........... | 704/270.1 |
| 2003/0064715 A1 * | 4/2003 | Sugane | ......................... | 455/414 |
| 2004/0008653 A1 * | 1/2004 | Cohen et al. | ................... | 370/338 |
| 2004/0139162 A1 * | 7/2004 | Adams et al. | .................. | 709/206 |
| 2004/0139163 A1 * | 7/2004 | Adams et al. | .................. | 709/206 |
| 2004/0199871 A1 * | 10/2004 | Lee | ................................ | 715/513 |
| 2004/0202117 A1 * | 10/2004 | Wilson et al. | .................. | 370/310 |
| 2004/0204125 A1 * | 10/2004 | Messel et al. | .................. | 455/566 |
| 2004/0210833 A1 * | 10/2004 | Lerner et al. | ................... | 715/512 |
| 2005/0070321 A1 * | 3/2005 | Weigele | ......................... | 455/517 |
| 2005/0097189 A1 * | 5/2005 | Kashi | ............................. | 709/217 |

(Continued)

FOREIGN PATENT DOCUMENTS

CN  1668051  9/2005

(Continued)

OTHER PUBLICATIONS

Outlook 2003 screenshots and script.*

(Continued)

*Primary Examiner* — Lester Kincaid
*Assistant Examiner* — Nathan Mitchell
(74) *Attorney, Agent, or Firm* — Birch, Stewart, Kolasch & Birch, LLP

(57) ABSTRACT

A mobile communication terminal and a method of link management are discussed. According to an embodiment, the terminal includes a display unit for indicating a message including at least one specific data; a link manager for setting a link to the at least one specific data included in the message, and assigning a sign to each specific data; and a transmitter for sending the message including the sign(s) assigned by the link manager.

14 Claims, 11 Drawing Sheets

U.S. PATENT DOCUMENTS

| | | | |
|---|---|---|---|
| 2005/0174961 A1* | 8/2005 | Hrastar | 370/328 |
| 2005/0266889 A1* | 12/2005 | Kuhl et al. | 455/564 |
| 2006/0047774 A1* | 3/2006 | Bowman et al. | 709/217 |
| 2006/0099907 A1* | 5/2006 | Park et al. | 455/3.02 |
| 2007/0038708 A1* | 2/2007 | Atyam et al. | 709/206 |
| 2010/0004032 A1* | 1/2010 | Kuhl et al. | 455/566 |

FOREIGN PATENT DOCUMENTS

| | | |
|---|---|---|
| JP | 10-155038 A | 6/1998 |
| JP | 11-331426 A | 11/1999 |
| JP | 2000-197131 A | 7/2000 |
| JP | 2001-186260 A | 7/2001 |
| JP | 2001-236283 A | 8/2001 |
| JP | 2002-63186 A | 2/2002 |
| JP | 2003-298719 A | 10/2003 |
| JP | 2004-157726 A | 6/2004 |
| JP | 2005-242790 A | 9/2005 |
| KR | 10-2004-0085955 A | 10/2004 |
| KR | 10-2005-0022399 A | 3/2005 |
| KR | 10-2005-0090885 A | 9/2005 |
| WO | WO0122680 A2 * | 3/2001 |
| WO | WO-2005/048019 A2 | 5/2005 |

OTHER PUBLICATIONS

Supplemental Outlook 2003 screenshots. Taken Jul. 30, 2010.*

* cited by examiner

MOBILE COMMUNICATION TERMINAL AND LINK MANAGEMENT METHOD OF THE SAME

The present application claims priority from Korean Patent Application No. 10-2005-0102635, filed Oct. 28, 2005, which is incorporated herein by reference.

BACKGROUND

1. Field of the Invention

This document relates to a method of setting and managing a link included in the message of a mobile communications terminal.

2. Description of the Related Art

Recently there has been a rapid increase in the demand of the mobile communication terminals. These mobile communication terminals provide various services and convenient functions.

A message sending and receiving function including a Short Message Service SMS, a Multimedia Message Service MMS and a Enhanced Messaging Service EMS is one of the various functions.

A user might select a link including a Uniform Resource Locator URL included in the message using the mobile communication terminal. Then, it is possible for the user to search a corresponding link information. URL means a system which indicates the locations of many servers that provide the various services on the internet, for example, a service including HTTP, FTP, usenet news, e-mail, gopher and telnet, in order to obtain the necessary information from the servers providing the various services.

Generally, URL is supported as the name type of protocol 'name://domain name//path name//file name', for example, http://www.lge.com, providing a hyperlink function by which a corresponding address is opened when the specific URL is selected. Generally, to select a specific URL on the screen of the mobile communications terminal in which URLs are indicated, the up or down key is pressed to move the selection bar such that the specific URL is directly selected and the connection button is pressed again to open the corresponding address of the selected URL.

But there is a problem that in case the specific URL which the user wants exists behind or below a list of other URLs indicated on a message, the up and down keys must be pressed many times in order to move the selection bar to open the address of the desired URL. Therefore, it takes much time to find and select the desired URL. In addition, it takes so much time to select all hyperlinked data. Such operation and its delay are inconvenient to the user, and complicate and limit the use of the terminal.

SUMMARY

A mobile communication terminal according to an aspect of the present invention comprises a display unit for displaying a message including one or more specific data; a link manager for setting a link to one or more specific data included in the displayed message, and assigning a given sign corresponding to the specific data; and a transmitter for sending the message including the sign assigning by the link manager.

According to an embodiment, the specific data comprises at least one of a name, a telephone number, an e-mail address, and a Uniform Resource Locator URL. The link manager selectively assigns the sign to correspond to one or more specific data. The format of the message is one of either Short Message Service SMS, Multimedia Message Service MMS, or Enhanced Messaging Service EMS. The mobile communication terminal further comprises an input unit for setting a link or assigning the sign to the specific data by a user.

A mobile communication terminal according to another aspect of the present invention comprises a receiver for receiving one or more linked specific data, and for receiving a message comprising a given sign to correspond to the linked specific data; a display unit for displaying the message received from the receiver; an input unit for selecting at least one of the sign assigned to the specific data of the message displayed on the display unit; and a controller for connecting the link corresponding to the sign selected by the input unit.

According to an embodiment, when the sign is not assigned to correspond to the specific data of the message received from the receiver, the sign is selectively assigned by a user to correspond to the specific data using the input unit. The mobile communication terminal further comprises a link manager for assigning a sign corresponding to the specific data, when the sign is not assigned to correspond to the specific data of the message received from the receiver.

A method for link management at a transmission side according to still another aspect of the present invention comprises (a) displaying a message including one or more specific data; (b) setting a link to one or more specific data included in the displayed message, and assigning a given sign corresponding the specific data; and (c) sending the message comprising the assigned sign. The method for link management at the transmission side further comprises a step of setting a link or assigning the sign to the specific data using an input unit by a user.

A method for link management at a receiving side according to still another aspect of the present invention comprises (a) receiving one or more linked specific data, and a message including a given sign to correspond to the linked specific data; (b) selecting at least one of the sign assigned to the specific data of the displayed message; and (c) connecting the link corresponding to the selected sign.

According to an embodiment, when the sign is not assigned to correspond to the specific data of the message received in the (a) step, the sign is selectively assigned to correspond to the specific data using the input unit by a user. A link manager assigns a sign corresponding to the specific data, when the sign is not assigned to correspond to the specific data of the message received in the (a) step.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF THE EMBODIMENTS

Embodiments of the present invention will be described herein below with reference to the accompanying drawings.

Figure 1:
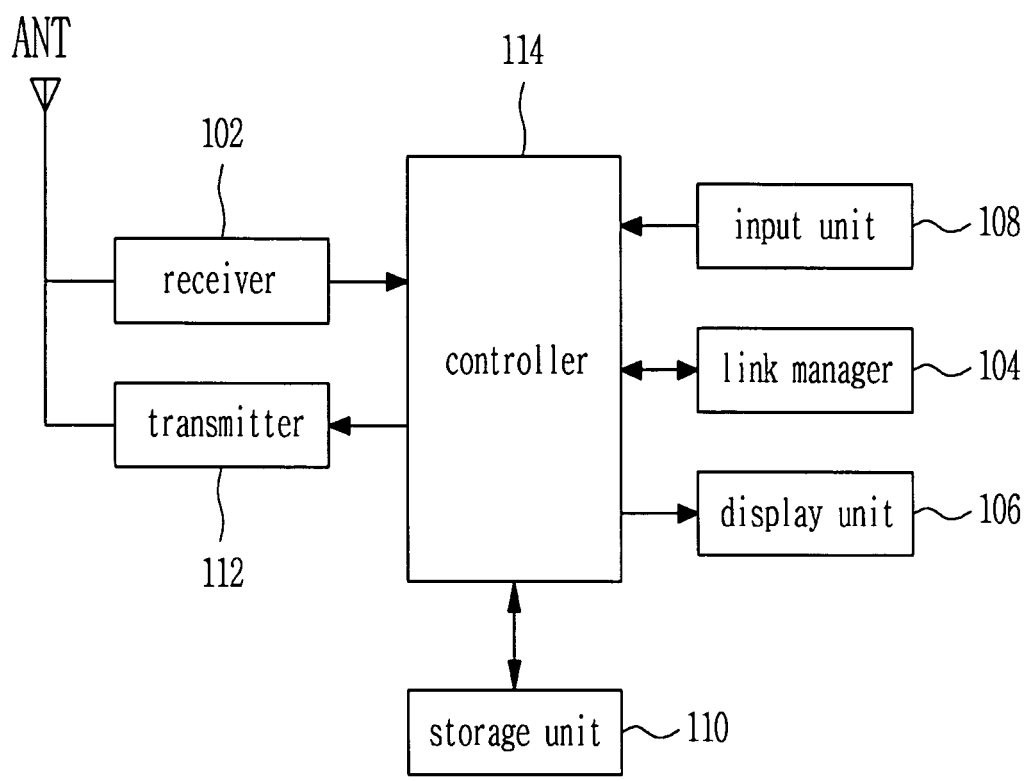
FIG. 1 is a block diagram showing the configuration of a mobile communications terminal according to an embodiment of the present invention.

FIG. 1 is a block diagram showing the configuration of a mobile communication terminal according to an embodiment of the present invention.

As shown in FIG. 1, the mobile communication terminal according to an embodiment of the present invention comprises an antenna ANT, a receiver 102, a link manager 104, a display unit 106, an input unit 108, a storage unit 110, a transmitter 112 and a controller 114. All components of the mobile terminal are operatively coupled and configured.

The receiver 102 receives a message, for example, at least one of Short Message Service (SMS), Multimedia Message Service (MMS) or Enhanced Messaging Service (EMS) through the antenna ANT from a base station communicating with the mobile communication terminal.

The link manager 104 sets a link to one or more specific data included in the message received from the receiver 102, assigning a predetermined sign corresponding to each linked data.

The display unit 106 displays the message including the sign(s) assigned by the link manager 104 on a screen of the display unit 106.

The input unit 108 includes at least one of a voice recognizer, a button/keypad portion and a touch screen. Therefore, if a user selects a sign assigned to a specific data in the message indicated on the screen of the display unit 106, the key input signal corresponding to the sign is generated and is outputted to the controller 114. Moreover, if the user inputs a sign using the input unit 108 to correspond to the specific data so as to assign a sign to the specific data, the key input signal corresponding to the sign is generated and is outputted to the controller 114.

The storage unit 110 may comprise flash memory, random access memory RAM, and/or electrically erasable programmable read only memory EEPROM. The storage unit 110 stores various information that is inputted by a user through the input unit 108. In addition, the storage unit 110 stores information such as a message received from the receiver 102 and a predetermined sign assigned to correspond to each of one or more specific data included in the message.

The transmitter 112 sends the message including the specific data with the sign(s) through the antenna ANT. Moreover, if a sign assigned to the specific data is selected or entered, then the mobile terminal connects to the link information set in that specific data. That is, the mobile terminal activates the link associated with the selected sign so as to dial a number, connect to a website, compose an e-mail, etc. according to the link.

The controller 114 controls the general operations of the mobile communication terminal, and controls transmission of the message including the specific data with the sign(s) assigned by the link manager 104 or the input unit 108 through the transmitter 112. Moreover, the controller 114 controls the transmitter 112 in order to connect or implement the connection according to the link information set in the specific data if the sign assigned to the specific data from the input unit 108 is selected.

An example of methods for link management at the transmission side and at the receiver side according to an embodiment of the present invention will be described with reference to FIGS. 2-9(c). The methods are implemented by using the mobile terminal of FIG. 1 or can be implemented using other suitable device.

<The Method for Link Management at Transmission Side>

Figure 2:
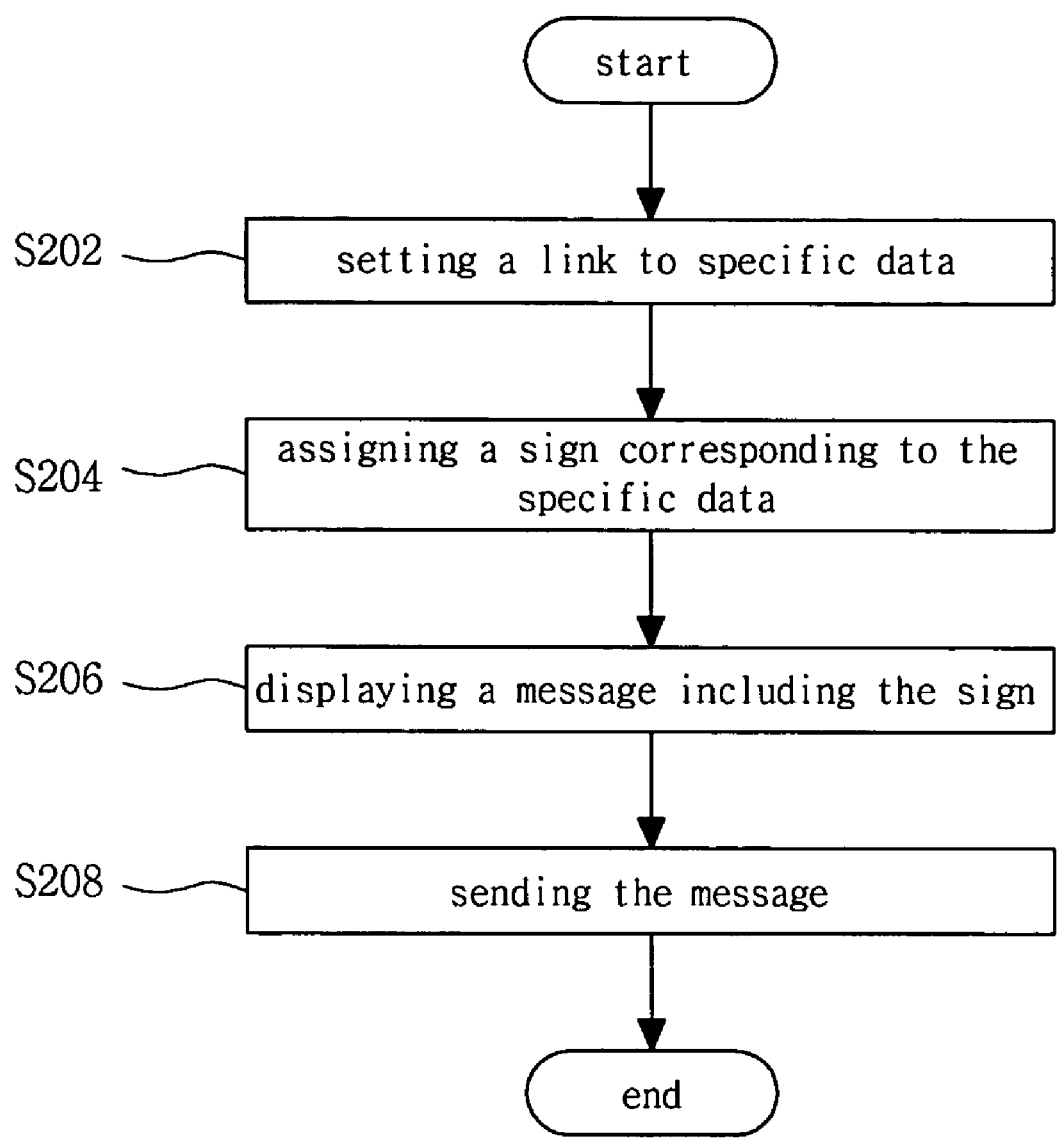
FIG. 2 is a flowchart showing a method for link management at the transmission side according to an embodiment of the present invention.
Figure 3:
FIG. 3 is a view showing an example of a state where a link is set up in specific data of a message according to an embodiment of the present invention.

FIG. 2 is a flowchart showing a method for link management at the transmission side according to an embodiment of the present invention. FIG. 3 is a view showing an example of a state where a link is set up in specific data of a message according to one embodiment of the present invention.

As shown in FIG. 2, the method for link management at the transmission side according to one embodiment of the present invention comprises setting a link to one or more specific data included in a message and assigning a predetermined sign corresponding to each link (S202~S204); displaying the message including the signs (S206); and sending the message including the signs to a recipient such as a mobile terminal at a receiving side (S208).

For example, as shown in FIG. 3, the link manager 104 sets a link to one or more specific data included in a short message. The link manager 104 sets a link to each specific data, which in this example is a telephone number, a Uniform Resource Locator URL, and an e-mail address included in the short message. At this time, URL is defined as an address indicated as a number such as Internet Protocol (IP) or as the domain name. Other types of data may be designated to set a link thereto.

More specifically, the link manager 104 sets a link to each specific data such as a telephone number "010-1234-5678", a URL "www.lge.com", and an e-mail address "chul@lge.com" included in the short message displayed on the display unit 106. In general, a link means that two or more programs are tied, such that when a user selects a corresponding link, the user can open the link information and the terminal implements the link information by opening appropriate program(s). For instance, a link to the telephone number "010-1234-5678" allows an automatic dialing of the telephone number when the linked data (or a sign thereof) is selected.

An underscore (underline or some other indication) is generally indicated in the specific linked data; however, it is not restricted in such way but may be set in other way by a user.

The link manager 104 assigns a sign to correspond to each specific data after the link is set up. An example will be illustrated in FIGS. 4(a)-4(c).

Figure 4A:
FIGS. 4(a), 4(b) and 4(c) show different examples of the screen where a sign is assigned according to an embodiment of the present invention.
Figure 4B:
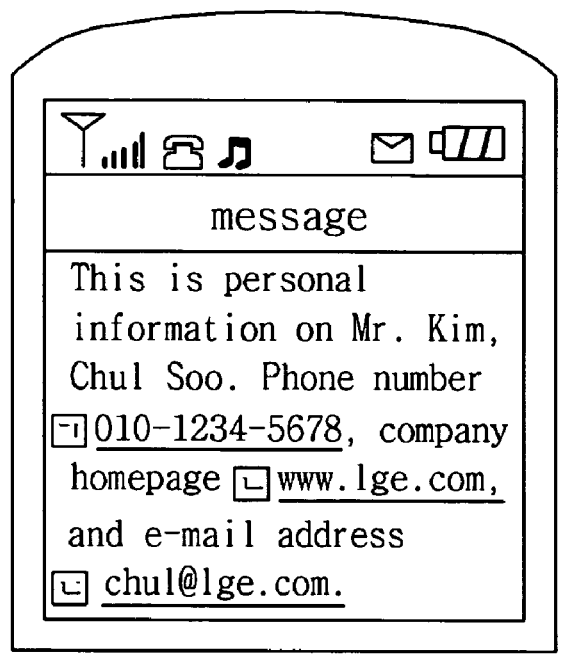
Figure 4:
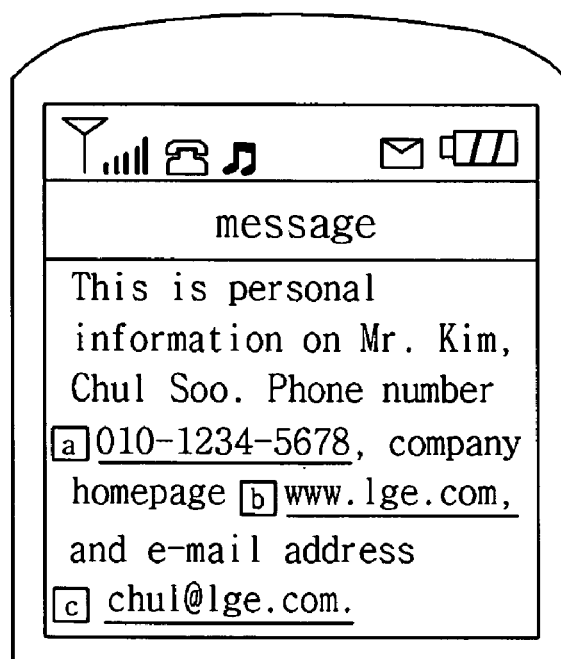

FIGS. 4(a)-4(c) show various examples of the screen where a sign is assigned according to an embodiment of the present invention.

As shown in FIGS. 4(a)-4(c), the link manager 104 assigns a sign corresponding to each specific data such as a telephone number "010-1234-5678", a URL "www.lge.com", and an e-mail address "chul@lge.com" data.

Here, the sign is a character, a number, or a combination of a number and a character, while the specific data refers to one or more of a name, a telephone number, an e-mail, or a Uniform Resource Locator URL.

In FIG. 4(a), the link manager 104 assigns a number (as a sign) to correspond to the specific data, and positions the number in front of the initial point of the specific data. For example, the number 1 is assigned to the telephone number of "010-1234-5678", the number 2 is assigned to the URL of "www.lge.com", and the number 3 is successively assigned to the e-mail address of "chul@lge.com". These numbers (signs) are positioned in front of the initial point of the specific data.

In another example, as shown in FIG. 4(b), the link manager 104 may successively give a character to correspond to the specific data. For example, a Korean character 'ㄱ' is assigned to "010-1234-5678" which is a telephone number, a Korean character 'ㄴ' is assigned to "www.lge.com" which is a URL, and a Korean character 'ㄷ' is successively assigned to "chul@lge.com" which is an e-mail address. These characters (signs) are positioned in front of the specific data in the message.

In another example, as shown in FIG. 4(c), the link manager 104 may successively assign an English alphabet as a character. For example, the character "a" is assigned to "010-1234-5678", the character "b" is assigned to "www.lge.com", and the character "c" is successively assigned to "chul@lge.com". These characters are positioned in the front of the specific data in the message.

Here, it is only illustrated that a sign is successively assigned so that the link manager 104 could associate the signs to the specific data, and the signs are positioned in the front of the specific data. However, as shown in FIGS. 5(a)-5(c), the signs can be positioned at other locations with respect to the specific data.

Figure 5A:
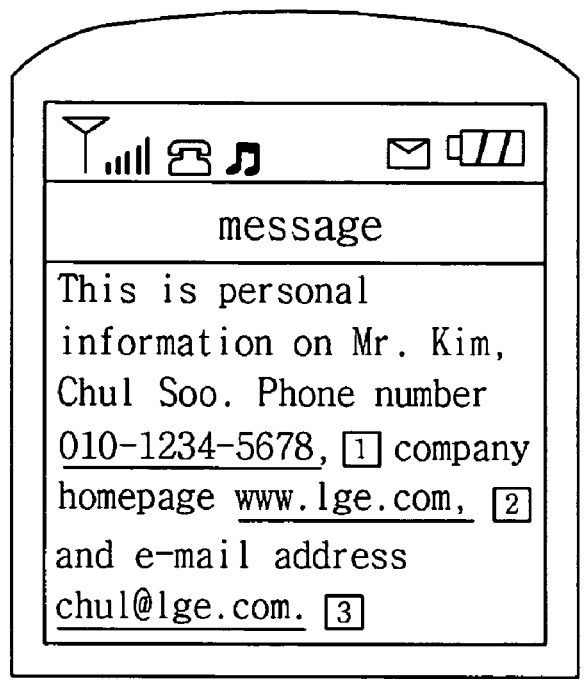
FIGS. 5(a), 5(b) and 5(c) show other examples of the screen where a sign is assigned according to an embodiment of the present invention.
Figure 5B:
Figure 5:
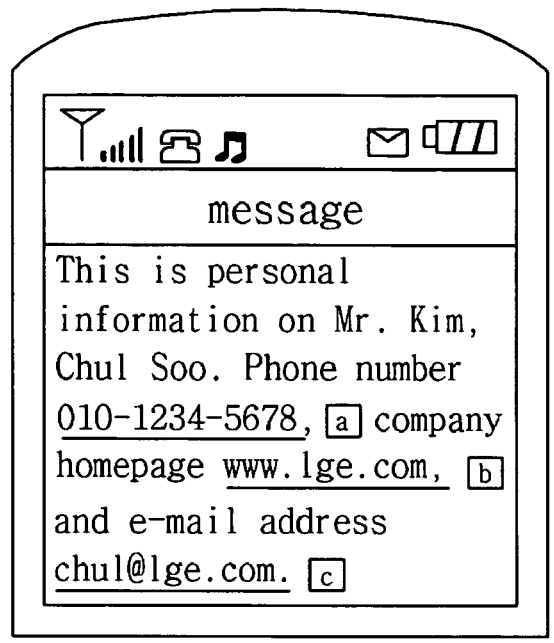

FIGS. 5(a)-5(c) show different examples of the screen where a sign is assigned according to an embodiment of the present invention.

As shown in FIGS. 5(a)-5(c), after a sign is successively assigned so that the link manager 104 may correspond the sign to a specific data, the signs can be positioned behind the specific data. For instance, if numbers (signs) are assigned to the specific data as shown in FIG. 5(a), the assigned numbers are positioned behind the telephone number "010-1234-5678", the URL "www.lge.com", and the e-mail address "chul@lge.com" respectively.

Similarly, if a character is assigned as a sign as shown in FIG. 5(b), it is positioned behind the telephone number "010-1234-5678", the URL "www.lge.com", and the e-mail address "chul@lge.com" respectively.

Similarly, if an alphabet is assigned as a sign as shown in FIG. 5(c), it can be positioned behind the specific data.

In this way, it is desirable that the location of the sign assigned by the link manager 104 may be set by considering easy recognition of specific data, which can be determined according to the preference of a user. That is, the user can decide on the location of the signs, which is entered and implemented by the controller 114.

The link manager 104 can automatically set up links and assign signs to specific data in a message. As an alternative, a user can enter a sign to be assigned to each specific data, so that the link manager 104 can assign the user-entered sign to the specific data. In case a user selectively tries to enter a specific sign to the specific data, a predetermined pop-up window can be provided, which will be discussed in more detail referring to FIG. 6.

Figure 6:
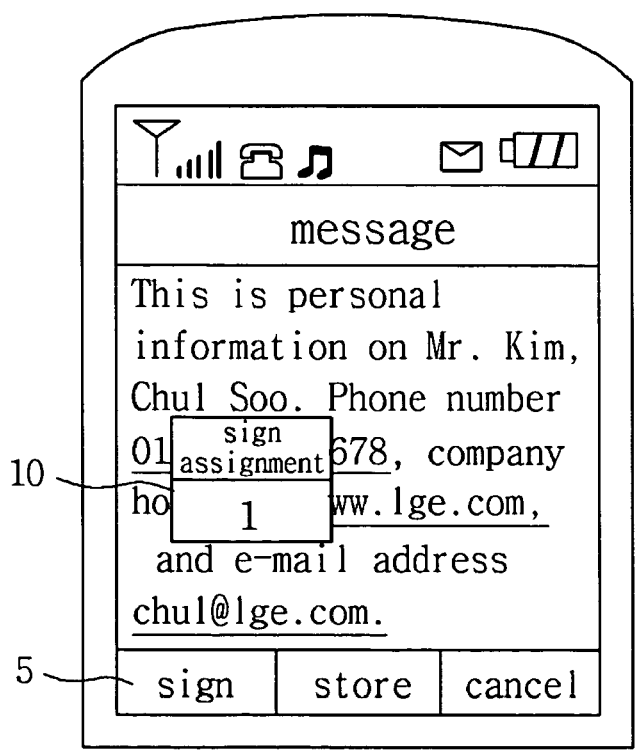
FIG. 6 shows an example of a screen where a pop-up window is provided to assign a sign according to an embodiment of the present invention.

FIG. 6 shows an example of a screen where a pop-up window is provided according to one embodiment of the present invention.

As shown in FIG. 6, when a user manually tries to enter a sign for a specific data in a message, a predetermined pop-up window 10 is displayed if the user selects a specific menu 5. Then the user can selectively input the desired sign to the corresponding pop-up window 10 by using the input unit 108, and assign the desired sign to the specific data.

The assigned signs can be displayed in a different format from the letters/characters of the message, so that the user can readily discriminate between the assigned signs and the letters of the message. An exemplary embodiment will be described in FIG. 7.

Figure 7A:
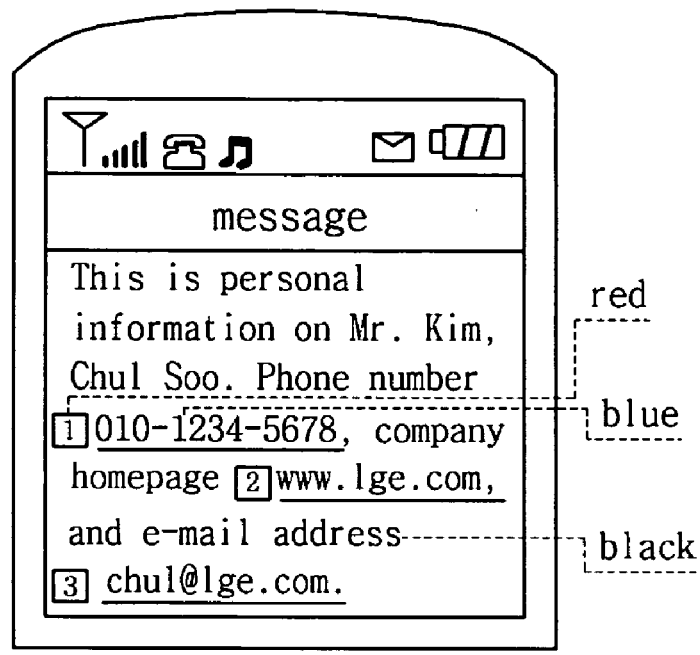
FIGS. 7(a), 7(b) and 7(c) show still other examples of the screen where the letters and characters of a message are displayed differently from signs according to an embodiment of the present invention.
Figure 7B:
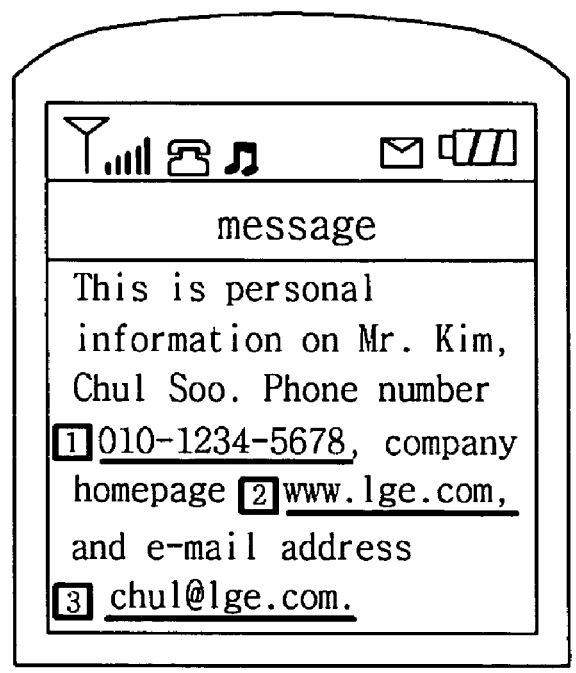
Figure 7C:
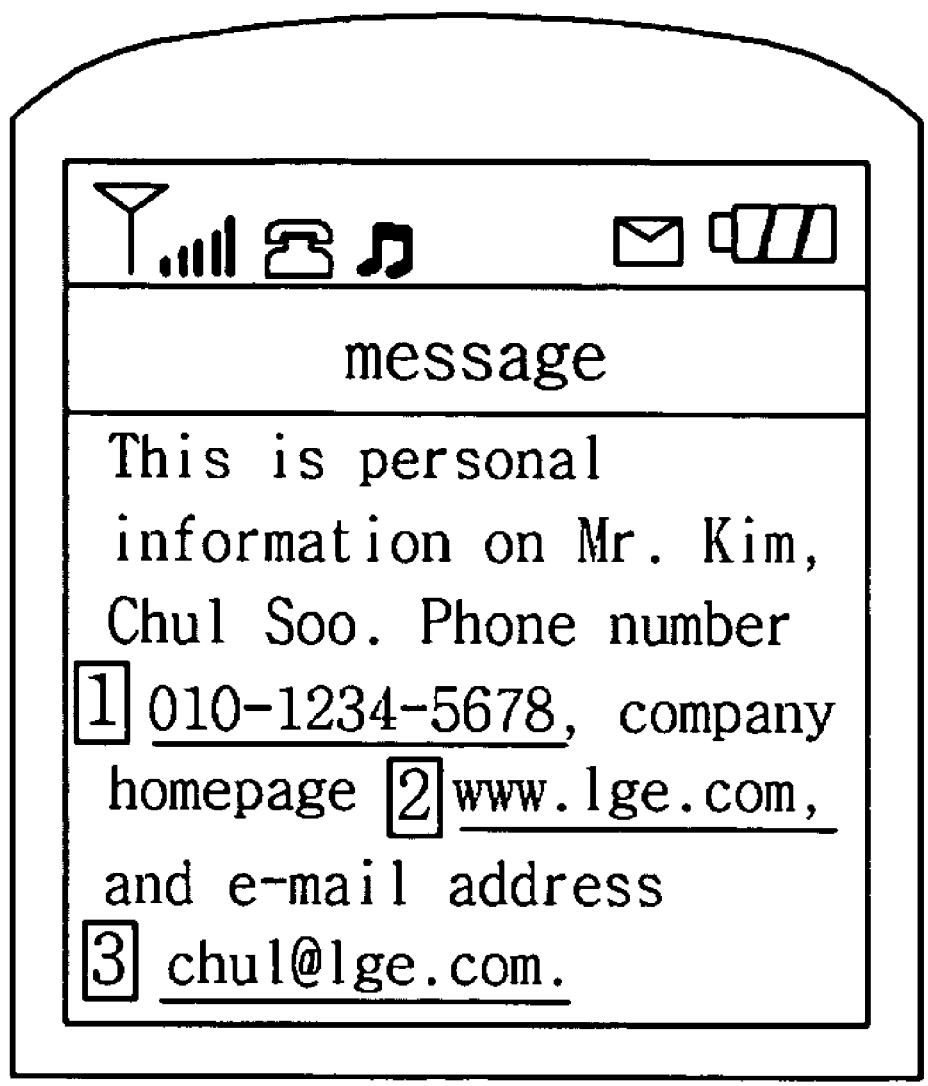

FIGS. 7(a)-7(c) show different examples of the screen where the assigned signs are displayed differently from the letters of a message according to one embodiment of the present invention.

As shown in FIGS. 7(a)-7(b), each sign assigned to correspond to a specific data may be differently displayed with the letters of the message such that the user can more readily distinguish between the assigned sign and the letters of the message.

For instance, as shown in FIG. 7(a), in case the color of the letters in the message is black, the color of the URL is set to be blue, while the number (sign) assigned to correspond to the URL is indicated by red. In this way, the user can readily distinguish them.

In another example, as shown in FIG. 7(b), the letters of the message may be bolder than the assigned the signs. For example, the number (sign) may be displayed to be in bold and/or underlined compared to the letters of the message.

In still another example, as shown in FIG. 7(c), the signs may be displayed in a different size from the size of the letters of the message. For example, the size of the number (sign) may be displayed to be bigger than the size of the letters of the message.

Although FIGS. 7(a)-7(b) illustrate the signs to be numbers, however, the teachings of FIGS. 7(a)-7(b) are equally applicable when the sign is a character or the combination of a number and a character.

Moreover, the thickness, the color and the size of the letters of the message and the sign described above are not restricted to the above, but they can be determined according to the preference of a user.

As illustrated in the above, the short message including the specific data with the sign(s) is displayed on the screen of the display unit 106 (S206).

Thereafter, the controller 114 transmits the short message to a recipient through the transmitter 112 (S208).

In the embodiment of the above, it is illustrated that the sign is a character or a number. However, the combination of a number and a character can also be used. For example, a combination of a character and a number such as a1, a2, etc. can be used as a sign. Other characters such as symbols, icons, etc. may be used as signs.

Also, it is illustrated that the specific data is a telephone number, a URL and an e-mail address, but it is not restricted to such data. For instance, the link manager 104 can recognize a name (e.g., a name of a person) as a specific data. However, with respect to a name, information including the telephone number (or other data) corresponding the name should be stored in the storage unit 110. Otherwise, the link manager 104 may not set up a link.

Further, it is illustrated that the input unit 108 is a button input. However, all types of input units which can select the sign assigned to a specific data such as a voice, a touch pad, etc. are applicable.

Further, it is illustrated that the message is a short message (SMS). However, it is not restricted to such type, but all message formats including the Multimedia Message Service (MMS) or the Enhanced Messaging Service (EMS) format are all applicable.

Further, the message can be a document, besides the above-described message. For example, a website page received from a predetermined application server can be the message.

<The Method for Link Management at Receiving Side>

Figure 8:
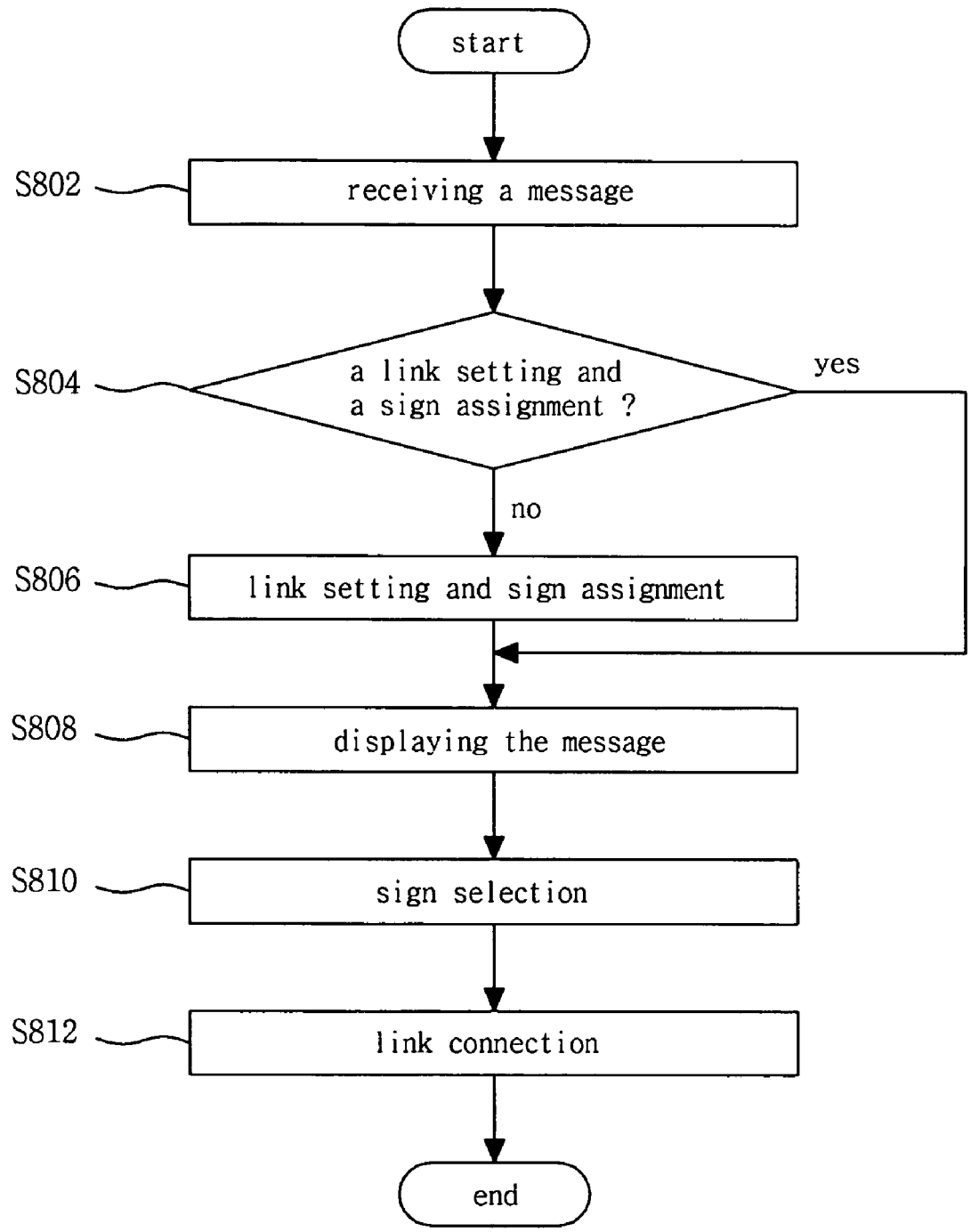
FIG. 8 is a flowchart showing a method for link management at the receiving side according to an embodiment of the present invention.

FIG. 8 is a flowchart showing a method for link management at the receiving side according to an embodiment of the present invention.

As shown in FIG. 8, the method for link management at the receiving side according to an embodiment of the present invention comprises receiving one or more specific linked data and a message including predetermined sign(s) assigned to correspond to the specific data from the transmitting side (S802); displaying the received message (S804~S808); selecting at least one of the signs assigned to the specific data of the indicated message (S810); and connecting to an appropriate entity according to the link information associated with the selected sign (S812).

If a message is received through the receiver 102 of a mobile terminal at the receiving side (S802), the link manager 104 of the receiving mobile terminal verifies whether or not a link is established and a sign is assigned to the specific data of the received message (S804). If the link is established and the sign is assigned to the specific data of the received message, the received message is displayed on the screen of the display unit 106 of the receiving mobile terminal (S808).

However, in case the link is not established and the sign is not assigned to the specific data of the received message, the link manager 104 of the receiving mobile terminal establishes a link and assigns a sign to correspond to the specific data of the received message (S806). In this regard, as the method for setting up a link and giving a sign to specific data is identical with the method described in the method for link management at the transmission side, the detailed description thereof will be omitted.

In this way, if the link is established and the sign is assigned to the specific data of the received message, the received message is displayed on the screen of the display unit 106 of the receiving mobile terminal (S808).

Thereafter, if a specific sign among the assigned signs is selected using the input unit 108, the controller 114 of the receiving mobile terminal makes a link connection according to the corresponding link associated with the selected sign (S812). At this time, to select a sign can mean that the button corresponding to the sign is pressed using the predetermined button portion which is provided by the input unit 108.

An example of a sign selection and a link connection/implementation at steps S810 and S812 of FIG. 8 will be described referring to FIGS. 9(a)-9(c).

Figure 9A:
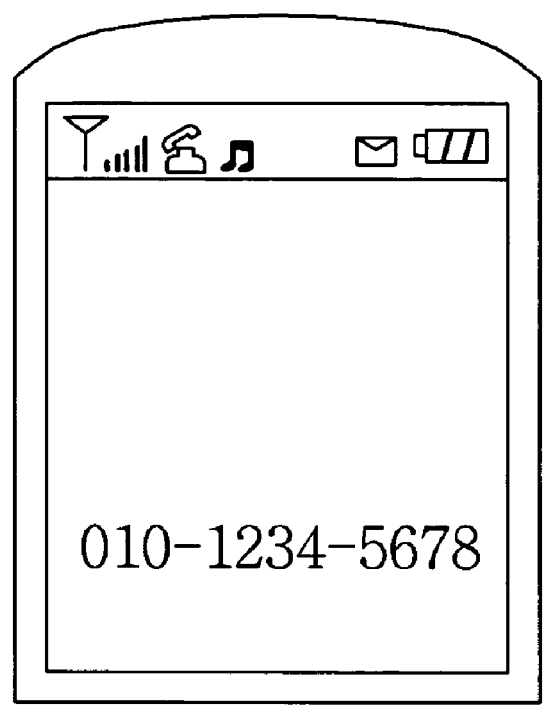
FIGS. 9(a), 9(b) and 9(c) are views showing examples of a state where a specific sign is selected and the corresponding link is connected according to an embodiment of the present invention.
Figure 9B:
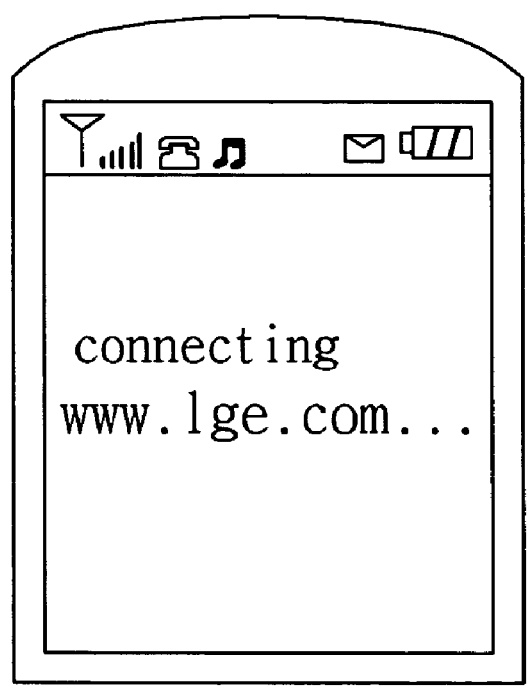
Figure 9C:

FIGS. 9(a)-9(c) show different examples of a state where a specific sign is selected to make a link connection according to an embodiment of the present invention.

In one example, as shown in FIG. 9(a), a sign assigned to the telephone number "010-1234-5678" in the message is selected by the input unit 108. Then the transmitter 112 transmits a call connection signal to the corresponding telephone number (link information). That is, a call is made to the telephone number of "010-1234-5678" automatically by the mobile terminal.

In another example, as shown in FIG. 9(b), if a sign assigned to "www.lge.com" in the message is selected by the input unit 108, the transmitter 112 requests for data provided from the address of the corresponding URL. That is, the mobile terminal automatically connects to the website of "www.lge.com".

In still another example, as shown in FIG. 9(c), if a sign to "chul@lge.com" in the message is selected by the input unit 108, a "send e-mail" menu is immediately opened in order for a user to write and send an e-mail to the address of "chul@lge.com".

In this way, when a user selects a sign assigned to the specific data by using the input unit 108, then the link information established to the specific data is automatically accessed and used to implement further connections/operations, which is convenient to the user.

It is illustrated that the URL selection method is applied to the mobile communication terminal. However, the present invention is not restricted thereto, but is applicable to all apparatuses for connecting the link information by displaying a specific data and selecting it.

The foregoing exemplary embodiments and aspects of the invention are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A mobile communication system, comprising:
a first mobile terminal including a wireless communication unit configured to communicate with at least one other terminal; a touch screen input unit configured to touch input a text message to be transmitted to the at least one other terminal, said text message being a real-time text message and not a non-real-time email message; a display configured to display the text message input on the input unit before the text message is transmitted to the at least one other terminal; a memory configured to store a phonebook including a plurality of contact information for a plurality of phone numbers, respectively; and a controller configured to determine if specific text data in the text message corresponds to one of the plurality of stored contact information, to automatically highlight and underline the specific text data in the text message when the specific text data corresponds to said one of the stored contact information and to attach a link to the specific text data, wherein the controller is further configured to control the wireless communication unit to directly transmit the text message to the at least one other terminal in real-time using only a phone number of the at least one other terminal and without having to search a memory of the mobile terminal for an email address corresponding to a user using the at least one other terminal; and
at least a second mobile terminal including a wireless communication unit configured to communicate with the first mobile terminal via a communication network; and a display configured to display a received text message sent from the first mobile terminal,
wherein the wireless communication unit of the second mobile terminal receives the transmitted text message, displays the received text message without having to first open an email, and automatically calls a phone number corresponding to the highlighted and underlined specific text data when the link is selected on the second mobile terminal, and
wherein the highlighted and underlined text specific text data is not used to access the Internet.

2. The mobile communication system of claim 1, wherein the controller is further configured to highlight the specific text data by changing a color of the specific data compared to a color of other data in the text message.

3. The mobile communication system of claim 2, wherein when the color of the other data is black, the controller is further configured to change the color of the specific data to be a blue color.

4. The mobile communication system of claim 1, wherein the controller is further configured to place an indication sign near the highlighted and underlined specific text data to indicate to the user of the at least one other terminal that the received text message includes selectable links corresponding to the highlighted and underlined specific text.

5. The mobile communication system of claim 1, wherein text data other than the specific text data included in the transmitted text message can not be selected.

6. The mobile communication system of claim 1, wherein the text message is one of a Short Message Service (SMS) message, a Multimedia Message Service (MMS) message, and an Enhanced Messaging Service (EMS) message.

7. The mobile communication system of claim 1, wherein the controller is further configured to control the display unit to display a text label including at least "message" at a top portion of the display unit when the text message is being input.

8. A method of controlling a mobile terminal, the method comprising:
  storing in a memory of the mobile terminal a phonebook including a plurality of contact information for a plurality of phone numbers, respectively;
  touch inputting a text message on a touch screen of the mobile terminal to be transmitted to at least one other terminal via wireless communication unit included in the mobile terminal, said text message being a real-time text message and not a non-real-time email message;
  displaying on the touch screen the input text message before the text message is transmitted to the at least one other terminal;
  determining if specific text data in the text message corresponds to one of the plurality of stored contact information; automatically highlighting and underlining the specific text data in the text message when the specific text data corresponds to said one of the stored contact information;
  attaching a link to the specific text data; and
  directly transmitting the text message to the at least one other terminal in real-time using only a phone number of the at least one other terminal and without searching a memory of the mobile terminal for an email address corresponding to a user using the at least one other terminal,
  wherein the at least one other terminal receives the transmitted text message, displays the transmitted text message without having to first open an email, and automatically calls a phone number corresponding to the highlighted and underlined specific text data when the link is selected on the at least one other terminal, and
  wherein the highlighted and underlined text specific text data is not used to access the Internet.

9. The method of claim 8, wherein the highlighting the specific text comprises highlighting the specific text data by changing a color of the specific data compared to a color of other data in the text message.

10. The method of claim 9, wherein when the color of the other data is black, the highlighting the specific text data changes the color of the specific data to be a blue color.

11. The method of claim 8, further comprising:
  placing an indication sign near the highlighted and underlined specific text data to indicate to the user of the at least one other terminal that the received text message includes selectable links corresponding to the highlighted and underlined specific text.

12. The method of claim 8, wherein text data other than the specific text data included in the transmitted text message can not be selected.

13. The method of claim 8, wherein the text message is one of a Short Message Service (SMS) message, a Multimedia Message Service (MMS) message, and an Enhanced Messaging Service (EMS) message.

14. The method of claim 8, further comprising:
  displaying a text label including at least "message" at a top portion of the display unit when the text message is being input.

* * * * *